(12) United States Patent
Shoji et al.

(10) Patent No.: US 6,648,117 B2
(45) Date of Patent: Nov. 18, 2003

(54) STARTING CLUTCH AND METHOD FOR CONTROLLING SAME

(75) Inventors: Masao Shoji, Fujisawa (JP); Yoshio Kinoshita, Shizuoka-ken (JP); Shiro Takeuchi, Shizuoka-ken (JP); Tadashi Watanabe, Kakegawa (JP); Tatsuro Miyoshi, Fukuroi (JP); Hirofumi Nakagomi, Fukuroi (JP); Hiroshi Yabe, Kakegawa (JP); Shigeharu Nishimura, Shizuoka-ken (JP); Nobuhiro Horiuchi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 59 days.

(21) Appl. No.: 09/953,939

(22) Filed: Sep. 18, 2001

(65) Prior Publication Data

US 2002/0038751 A1 Apr. 4, 2002

(30) Foreign Application Priority Data

Sep. 22, 2000 (JP) ........................................ 2000-288695

(51) Int. Cl.[7] .............................................. F16D 25/00
(52) U.S. Cl. ................... 192/55.61; 192/70.12; 192/70.17; 192/91 A; 192/113.34
(58) Field of Search ............................ 192/91 R, 91 A, 192/89.2, 212, 110 B, 55.61, 70.12, 70.17, 85 AA, 113.34

(56) References Cited

U.S. PATENT DOCUMENTS

| | | | | |
|---|---|---|---|---|
| 5,301,564 A | * | 4/1994 | Muller et al. | 74/15.4 |
| 6,332,521 B1 | * | 12/2001 | Shoji | 192/55.61 |
| 6,375,233 B1 | * | 4/2002 | Friedmann et al. | 285/136.1 |
| 6,397,996 B1 | * | 6/2002 | Yabe | 192/55.61 |
| 6,446,779 B1 | * | 9/2002 | Yabe | 192/213 |

* cited by examiner

*Primary Examiner*—Saul Rodriquez
(74) *Attorney, Agent, or Firm*—Miles & Stockbridge P.C.

(57) ABSTRACT

The present invention provides a starting clutch in which an input side element and an output side element are joined together by applying an axial load thereby to transmit a power, which clutch comprises an urging device for always providing the axial load, and a releasing device for releasing the input side element and the output side element from the axial load.

48 Claims, 2 Drawing Sheets

STARTING CLUTCH AND METHOD FOR CONTROLLING SAME

BACKGROUND OF THE INVENTION

1. Field of the Invention

The present invention relates to a starting clutch which can be used in place of a torque converter of a motor vehicle.

2. Related Background Art

Conventionally, in an AT (automatic transmission), a vehicle was started by transmission of torque in a torque converter. Since the torque converter had a torque amplifying effect and torque could smoothly be transmitted during increase and decrease of the torque, the torque converter was mounted to many AT motor vehicles.

On the other hand, the torque converter has a disadvantage that a slip amount is great during increase and decrease of the torque and thus not so efficient.

Thus, recently, use of a starting clutch in place of the torque converter has been proposed, and torque has been amplified at a low speed area by decreasing a gear ratio and increasing a transmission number.

FIG. 2 is an axial sectional view of a conventional starting clutch. Now, such a starting clutch will be explained. The starting clutch 100 includes a multi-plate clutch 101. Within a clutch case 106 of the multi-plate clutch 101, friction plates 102 acting as output side friction engaging elements and separator plates 103 acting as input side friction engaging elements are alternately disposed.

Further, a backing plate 104 is provided at one axial end of the multi-plate clutch. The backing plate 104 is supported by a stop ring 105 at an axial outer side (left in FIG. 2). On the other hand, at an end opposite to the backing plate 104, a piston 108 is disposed within an inner wall of the clutch case 106 through an O-ring 107. The piston 108 is biased by a return spring 116 toward a direction (right in FIG. 2) along which an engaging condition between the separator plates 103 and the friction plates 102 is released. Further, a hydraulic chamber 109 is defined between the piston 108 and the clutch case 106.

The starting clutch 100 further includes a housing 110 covering an outer periphery of the multi-plate clutch 101, and a damper 117 disposed between the clutch case 106 and the housing 110. Incidentally, the housing 110 is connected to an output shaft 111 of an engine (not shown) and the damper 117 is constituted by a spring 130, a retainer plate 113 for holding the spring 130 and a pawl 114 engaging by the spring 130.

In the above-mentioned starting clutch 100, the piston 108 is operated by supplying hydraulic pressure into the hydraulic chamber 109 through an oil path 115, thereby effecting frictional engagement between the separator plates 103 and the friction plates 102.

As mentioned above, in the starting clutch 100, the piston 108 is operated by supplying the hydraulic pressure into the hydraulic chamber 109 through the oil path 115, thereby effecting the frictional engagement. That is to say, upon operation of the starting clutch (upon transmission of power), the hydraulic pressure always acts. A predetermined clearance is provided, and, since the clearance is maintained by a biasing force of the return spring 116 against the piston, torque is completely blocked upon releasing.

When it is desired to release the engaging condition between the separator plates 103 and the friction plates 102, the hydraulic pressure is released. When the hydraulic pressure is released, the piston 108 can be moved freely and thus is shifted to the right in FIG. 2 by the biasing force of the return spring 116. As a result, the engaging condition between the separator plates 103 and the friction plates 102 is released.

However, in order to maintain the frictional engaging condition between the separator plates 103 and the friction plates 102, the hydraulic pressure must always be supplied. Further, an operating time of a pump for supplying the hydraulic pressure to maintain the hydraulic pressure becomes longer. And, a mechanism can be complicated.

SUMMARY OF THE INVENTION

Therefore, an object of the present invention is to provide a starting clutch in which hydraulic pressure is not required to always be supplied, and an operating time of a pump for supplying the hydraulic pressure can be shortened, and operating efficiency is enhanced.

To achieve the above object, the present invention provides a starting clutch in which an input side element and an output side element are joined together by applying an axial load thereby to transmit a power, which clutch comprises urging means for always providing the axial load, and releasing means for releasing the input side element and the output side element from the axial load.

Further the present invention provides a method for controlling a starting clutch, in which the clutch is released by supplying hydraulic pressure and the clutch is engaged by releasing the hydraulic pressure.

Since the input side element and the output side element are frictionally engaged together by the spring for always providing the axial load and a hydraulic cylinder for releasing the input side element and the output side element from the axial load is provided, in the operation of the starting clutch, the hydraulic pressure may be supplied only upon releasing the clutch, with the result that the operating time of the pump for supplying the hydraulic pressure is shortened thereby to enhance the operating efficiency. Further, since the urging load given by the spring is provided by the mechanical means, good stability can be achieved. Accordingly, stable control can easily be performed.

Since the clutch is released by supplying the hydraulic pressure and the clutch is engaged by releasing the hydraulic pressure, a starting clutch controlling method in which operating efficiency is enhanced can be provided.

DESCRIPTION OF THE PREFERRED EMBODIMENTS

The present invention will now be fully explained in connection with an embodiment thereof with reference to the accompanying drawings. Incidentally, it should be noted that the illustrated embodiment is merely an example and various alterations and modifications can be made within the scope of the invention.

Figure 1:
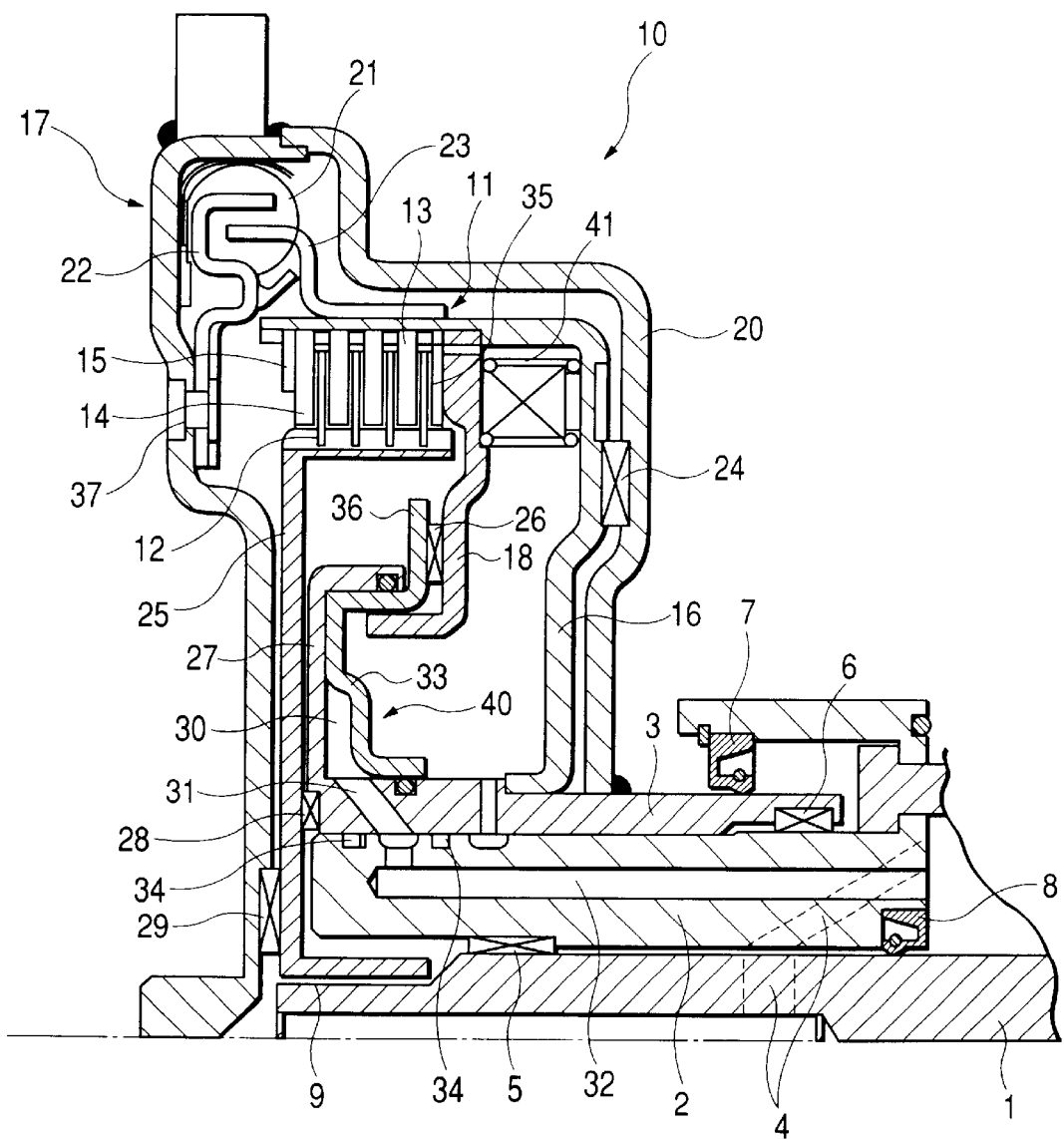
FIG. 1 is an axial sectional view of a starting clutch according to an embodiment of the present invention.
Figure 2:
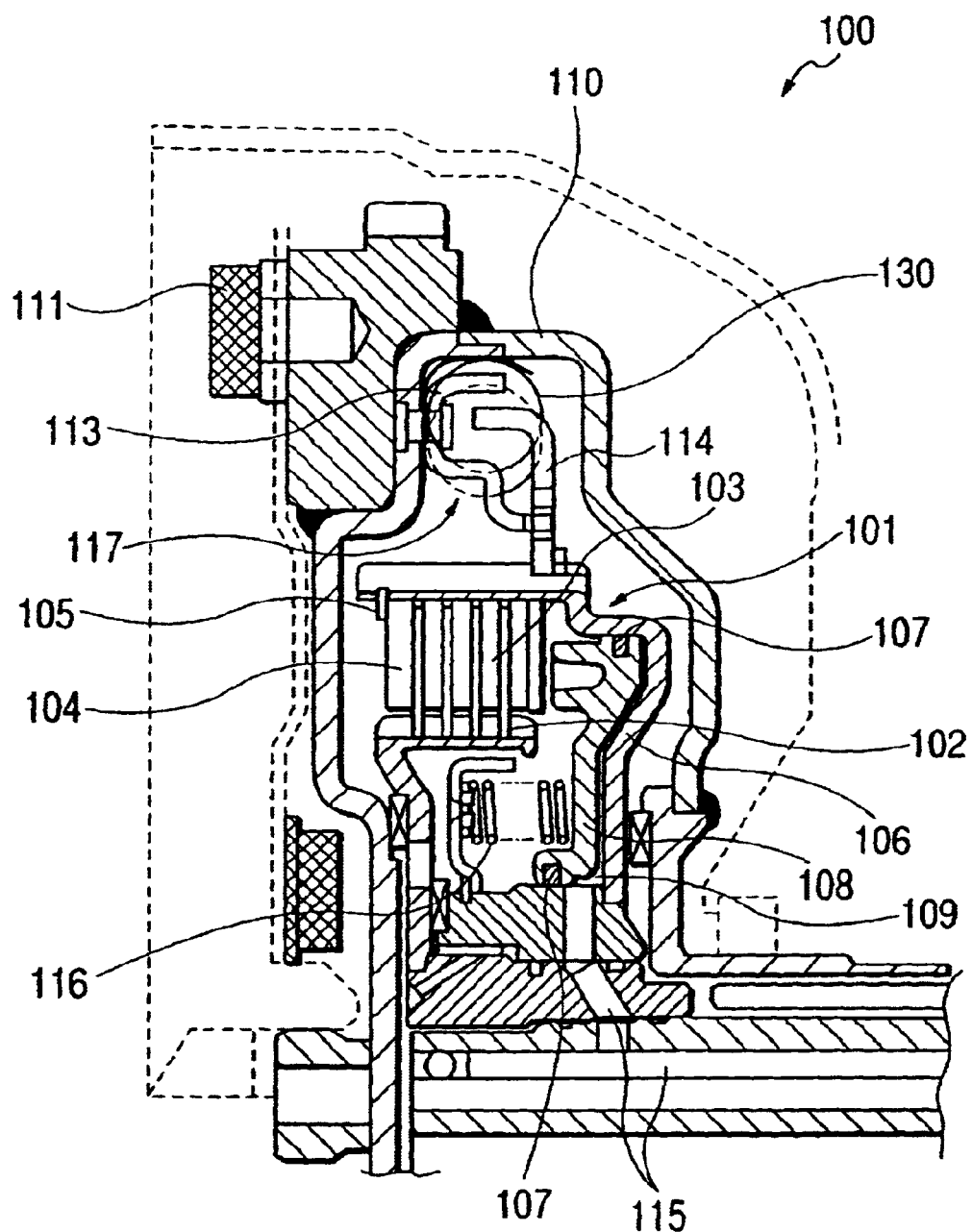
FIG. 2 is an axial sectional view of a conventional starting clutch.

FIG. 1 is an axial sectional view of a starting clutch according to an embodiment of the present invention. The starting clutch 10 includes a multi-plate clutch 11. Within a clutch case 16 of the multi-plate clutch 11, substantially annular friction plates 12 acting as output side friction engaging elements and substantially annular separator plates 13 acting as input side friction engaging elements are disposed alternately along an axial direction. At one axial end of the clutch case 16, a substantially annular backing plate 14 is fixedly supported by a substantially annular stop ring 15 in the axial direction.

Although the multi-plate clutch 11 is constituted by four friction plates 12 and four separator plates 13, it should be noted that the number of the input side and output side friction engaging elements can be changed in accordance with required torque. Further, a friction material or a plurality of friction materials 35 divided into plural segments are secured to each axial surface of the friction plate 12 by an adhesive or the like. Of course, in accordance with the required torque, the friction material may be secured to only one surface of the friction plate 12.

On the other hand, in FIG. 1, at the right side in the axial direction, a piston 18 is disposed between the friction engaging elements and an inner surface of the clutch case 16, and a spring 41 is disposed between the piston 18 and the clutch case 16. The spring 41 is a coil spring having predetermined elasticity but may be a spring of other type.

The piston 18 is always biased toward a direction along which the friction plates 12 and the separator plates 13 are frictionally engaged or joined together by a mechanical urging force of the spring 41. In order to release an engaging condition between the friction plates 12 and the separator plates 13, a hydraulic mechanism (described later) is used.

The starting clutch 10 further includes the multi-plate clutch 11, a housing 20 covering an outer periphery of the multi-plate clutch 11, and a damper 17 acting as a shock damping mechanism and disposed between the clutch case 16 and the housing 20. Incidentally, the damper 17 is provided on an inner wall of the housing 20 and is constituted by a retainer plate 22 for holding a spring 21 and a pawl 23 engaging the spring 21. The retainer plate 22 is secured to the housing 20 by a rivet 37. The housing 20 covers the multi-plate clutch 11, the piston 18 and a cylinder portion which will be described later.

A thrust washer 24 is disposed between the clutch case 16 and the housing 20. A needle bearing may be used in place of the thrust washer 24. A driven rotary member 3 is fitted into the clutch case 16. The driven rotary member 3 is rotatably supported by a fixed member 2 through a bearing 6. The fixed member 2 is supported by an output shaft 1 through a seal bearing 8 and a bearing 5. The seal bearing 8 may be an O-ring or other seal member.

A seal bearing 7 is provided an outer peripheral surface of the driven rotary member 3 to provide a seal between the driven rotary member 3 and the fixed member 2. The seal bearing 7 may be an O-ring or other seal member. The output shaft 1 is provided with a lubricating oil supplying path 4 to supply lubricating oil to various parts of the starting clutch 10. The lubricating oil can be supplied through a gap between the output shaft 1 and the fixed member 2. An oil path 32 extending in the axial direction is formed in the fixed member 2 and hydraulic pressure is supplied from a pump (not shown) of a hydraulic circuit (not shown) through the oil path. The oil path 32 is communicated with an oil chamber 30 (described later) through an oil path 31 radially extending through the driven rotary member 3, thereby supplying predetermined hydraulic pressure to the oil chamber 30.

At one axial end, the output shaft 1 is provided at its outer periphery with a spline 9 onto which an inner peripheral portion of a hub 25 for holding the plurality of friction plates 12 at its outer periphery is fitted. That is to say, the hub 25 is rotated integrally with the output shaft 1. A thrust washer 29 disposed between the hub 25 and the housing 20. A needle bearing may be used in place of the thrust washer 29.

Next, the hydraulic mechanism according to the illustrated embodiment will be explained. A cylinder case portion 27 is integrally formed with one axial end of the driven rotary member 3 positioned within the clutch case 16. A cylinder plate 33 is slidably fitted into the cylinder case portion 27 constituting a hydraulic cylinder for an axial movement, thereby defining the oil chamber 30. Two O-ring seals are disposed between the cylinder case portion 27 and the cylinder plate 33, thereby providing an oil-tight condition of the oil chamber 30. Incidentally, the cylinder case portion 27 may be independent from the driven rotary member 3.

As mentioned above, the oil chamber 30 is communicated with the oil path 32 of the fixed member 2 and the oil path 31 of the driven member. Two seal bearings 34 are disposed between the fixed member 2 and the driven rotary member 3 on both sides of the oil path 31, thereby sealing the oil path to prevent leakage of hydraulic pressure. A thrust washer 28 is provided between the axial end of the driven rotary member 3 and the hub 25. A needle bearing may be used in place of the thrust washer 28.

A radial outward extension 36 of the cylinder plate 33 is opposed to the piston 18 in the axial direction, and a thrust washer 26 is disposed between the extension 36 and the piston 18. A needle bearing may be used in place of the thrust washer 26. The hydraulic pressure supplied from the oil path 32 of the fixed member 2 is supplied to the oil chamber 30 through the oil path 31.

The cylinder plate 33 is shifted in a direction along which the cylinder plate is separated from the cylinder case portion 27 in the axial direction, i.e., along which the piston 18 is urged, by the hydraulic pressure generated in the oil chamber 30. When the piston 18 is urged by the cylinder plate 33, the piston 18 is shifted to the right in FIG. 1 in opposition to a biasing force of the spring 41. As a result, since the piston 18 is separated from the separator plate 13, the engaging condition between the friction plates 12 and the separator plates 13 is released.

In the illustrated embodiment, the driving torque from the engine (not shown) is transmitted to the output shaft 1 through the housing 20, damper 17, clutch case 16, separator plates 13, friction plates 12 and hub 25.

As mentioned above, in another aspect of the present invention, since the clutch is released by supplying the hydraulic pressure and the clutch is engaged by releasing the hydraulic pressure, a starting clutch controlling method in which operating efficiency is enhanced can be provided.

In the illustrated embodiment of the present invention as mentioned above, the clutch of the starting clutch in which the input side elements and the output side elements are frictionally engaged with each other by the axial load may be, for example, a wet type of dry type multi-plate clutch, a single plate clutch or a cone clutch, and the spring as the urging means may be, for example, a leaf spring, a coil spring or a wave spring. Further, the urging force of the urging means, i.e., spring pressure and the hydraulic pressure are set in consideration of properties such as a weight of a vehicle, coefficient of friction of the friction engaging elements of the starting clutch, an area of the friction engaging surface and the like.

The starting clutch of the present invention mentioned above has the following advantages.

In the operation of the starting clutch, since the hydraulic pressure may be supplied only upon releasing the clutch, the operating time of the pump for supplying the hydraulic pressure is shortened. Further, the operating efficiency and the controlling ability can be enhanced.

What is claimed is:

1. A starting clutch, comprising:
   an input side element and an output side element which are engaged with each other by applying an axial load, thereby to transmit power;
   a damper;
   urging means for permanently providing the axial load to said input side element and said output side element; and
   releasing means for releasing said input side element and said output side element from the axial load to release the engagement of said input side element and said output side element.

2. A starting clutch according to claim 1, wherein said urging means includes a spring.

3. A starting clutch according to claim 1, wherein said releasing means includes a piston operated in a direction along which said piston is separated from said input side element and said output side element.

4. A starting clutch according to claim 3, wherein said piston is operated by a hydraulic cylinder.

5. A starting clutch according to any one of claims 1 to 4, wherein said input side element is a separator plate of a multi-plate clutch, and said output side element is a friction plate of said multi-plate clutch.

6. A starting clutch according to claim 5, wherein said multi-plate clutch is a wet type multi-plate clutch.

7. A starting clutch according to claim 5, wherein a hub of said multi-plate clutch is connected to an output shaft.

8. A starting clutch according to claim 1, wherein a fixed member is disposed on an outer periphery of an output shaft, and a driven rotary member is disposed on an outer periphery of said fixed member.

9. A starting clutch according to claim 8, wherein said releasing means includes a piston operated by a hydraulic cylinder in a direction along which said piston is separated from said input side element and said output side element, and a cylinder case portion of said hydraulic cylinder is provided on said driven rotary member.

10. A starting clutch according to claim 8 or 9, wherein said input side element is a separator plate of a multi-plate clutch, said output side element is a friction plate of said multi-plate clutch, and a clutch case of said multi-plate clutch is provided on said driven rotary member.

11. A starting clutch according to claim 10, wherein said urging means includes a spring disposed between said clutch case and a piston of said releasing means, said piston being operated in a direction along which said piston is separated from said input side element and said output side element.

12. A starting clutch according to claim 11, wherein separator plates as input side elements and friction plates as output side elements are alternately arranged on an inner periphery of said clutch case and on an outer periphery of a hub of said starting clutch, respectively.

13. A starting clutch according to claim 8, wherein at least one of said fixed member and said output shaft is provided with a lubricating oil supplying path.

14. A starting clutch according to claim 13, wherein lubricating oil is supplied through a gap between said output shaft and said fixed member.

15. A starting clutch according to claim 9, wherein an oil path communicating with an oil chamber of said cylinder through said fixed member and said driven rotary member is provided.

16. A starting clutch according to claim 8, wherein an outer periphery of said driven rotary member is is sealed.

17. A starting clutch according to claim 8, wherein a seal is provided between said output shaft and said fixed member.

18. A starting clutch according to claim 5, further comprising a housing covering said multi-plate clutch, said piston and said hydraulic cylinder.

19. A starting clutch according to claim 18, wherein a thrust washer or a needle bearing is disposed between said housing and a hub of the starting clutch.

20. A starting clutch according to claim 18, wherein a thrust washer or a needle bearing is disposed between said housing and a clutch case provided on a driven rotary member.

21. A starting clutch according to claim 4, wherein a thrust washer or a needle bearing is disposed between said piston and a cylinder plate of said hydraulic cylinder.

22. A starting clutch according to claim 8, wherein a thrust washer or a needle bearing is disposed between a hub of the starting clutch and said driven rotary member.

23. A starting clutch according to claim 8, wherein a bearing is disposed between said fixed member and said output shaft.

24. A starting clutch according to claim 8, wherein a bearing is disposed between said fixed member and said driven rotary member.

25. A starting clutch according to claim 23 or 24, wherein said bearing includes a seal bearing.

26. A starting clutch according to claim 24, wherein said bearing includes a seal bearing disposed on an outer periphery of said driven rotary member.

27. A starting clutch according to claim 25, wherein seal bearings are disposed on both sides of a hydraulic pressure connecting portion between said fixed member and said driven rotary member.

28. A starting clutch according to claim 1, wherein said damper comprises a retainer plate secured to a housing, a pawl secured to a clutch case, and a spring disposed between said retainer plate and said pawl.

29. A starting clutch according to claim 1 or 28, wherein driving torque from an engine is transmitted to an output shaft successively through a housing, said damper, a clutch case, a separator plate, a friction plate and a hub.

30. A method for controlling a starting clutch having input and output side elements, which are engaged with each other to transmit power, said method comprising:
    maintaining said input and output side elements in an engaged state without supplying hydraulic pressure; and
    releasing said input and output side elements from the engaged state by supplying hydraulic pressure.

31. A method for controlling a starting clutch having input and output side elements, which are engaged with each other to transmit power, and further having a damper, said method comprising: maintaining said input and output side elements in an engaged state without supplying hydraulic pressure; and releasing said input and output side elements from the engaged state by supplying hydraulic pressure.

32. A starting clutch, comprising:
    an input side element and an output side element which are engaged with each other by applying an axial load, thereby to transmit power;
    urging means for permanently providing the axial load to said input side element and said output side element; and
    releasing means for releasing said input side element and said output side element from the axial load to release the engagement of said input side element and said output side element;

wherein a fixed member is disposed on an outer periphery of an output shaft, and a driven rotary member is disposed on an outer periphery of said fixed member;

wherein said input side element is a separator plate of a multi-plate clutch, said output side element is a friction plate of said multi-plate clutch, and a clutch case of said multi-plate clutch is provided on said driven rotary member; and wherein said urging means includes a spring disposed between said clutch case and a piston of said releasing means, said piston being operated in a direction along which said piston is separated from said input side element and said output side element.

33. A starting clutch according to claim 32, wherein said piston is operated by a hydraulic cylinder, and a cylinder case portion of said hydraulic cylinder is provided on said driven rotary member.

34. A starting clutch according to claim 32 or 33, wherein separator plates and friction plates are alternately arranged on an inner periphery of said clutch case and an outer periphery of a hub of said starting clutch, respectively.

35. A starting clutch, comprising:
an input side element and an output side element which are engaged with each other by applying an axial load, thereby to transmit power;
urging means for permanently providing the axial load to said input side element and said output side element; and
releasing means for releasing said input side element and said output side element from the axial load to release the engagement of said input side element and said output side element;
wherein said input side element is a separator plate of a multi-plate clutch, and said output side element is a friction plate of said multi-plate clutch;
wherein said multi-plate clutch is a wet type multi-plate clutch;
wherein a hub of said multi-plate clutch is connected to an output shaft;
wherein a fixed member is disposed on an outer periphery of said output shaft, and a driven rotary member is disposed on an outer periphery of said fixed member;
wherein at least one of said fixed member and said output shaft is provided with a lubricating oil supplying path; and
wherein lubricating oil is supplied through a gap between said output shaft and said fixed member.

36. A starting clutch according to claim 35, wherein said urging means includes a spring.

37. A starting clutch according to claim 35, wherein said releasing means includes a piston operated in a direction along which said piston is separated from said input side element and said output side element.

38. A starting clutch according to claim 37, wherein said piston is operated by a hydraulic cylinder.

39. A starting clutch, comprising:
an input side element and an output side element which are engaged with each other by applying an axial load, thereby to transmit power;
urging means for permanently providing the axial load to said input side element and said output side element; and
releasing means for releasing said input side element and said output side element from the axial load to release the engagement of said input side element and said output side element;

wherein a fixed member is disposed on an outer periphery of said output shaft, and a driven rotary member is disposed on an outer periphery of said fixed member;

wherein said releasing means includes a piston operated by a hydraulic cylinder in a direction along which said piston is separated from said input side element and said output side element, and a cylinder case portion of said hydraulic cylinder is provided on said driven rotary member;

wherein an oil path communicating with an oil chamber of said cylinder through said fixed member and said driven rotary member is provided.

40. A starting clutch, comprising:
an input side element and an output side element which are engaged with each other by applying an axial load, thereby to transmit power;
urging means for permanently providing the axial load to said input side element and said output side element; and
releasing means for releasing said input side element and said output side element from the axial load to release the engagement of said input side element and said output side element;
wherein a fixed member is disposed on an outer periphery of an output shaft, and a driven rotary member is disposed on an outer periphery of said fixed member; and
wherein an outer periphery of said driven rotary member is sealed.

41. A starting clutch, comprising:
an input side element and an output side element which are engaged with each other by applying an axial load, thereby to transmit power;
urging means for permanently providing the axial load to said input side element and said output side element; and
releasing means for releasing said input side element and said output side element from the axial load to release the engagement of said input side element and said output side element;
wherein a fixed member is disposed on an outer periphery of an output shaft, and a driven rotary member is disposed on an outer periphery of said fixed member; and
wherein a seal is provided between said output shaft and said fixed member.

42. A starting clutch, comprising:
an input side element and an output side element which are engaged with each other by applying an axial load, thereby to transmit power;
urging means for permanently providing the axial load to said input side element and said output side element; and
releasing means for releasing said input side element and said output side element from the axial load to release the engagement of said input side element and said output side element;
wherein a fixed member is disposed on an outer periphery of an output shaft, and a driven rotary member is disposed on an outer periphery of said fixed member;

wherein a bearing is disposed between said fixed member and said output shaft; and wherein said bearing includes a seal bearing.

43. A starting clutch, comprising:

an input side element and an output side element which are engaged with each other by applying an axial load, thereby to transmit power;

urging means for permanently providing the axial load to said input side element and said output side element; and releasing means for releasing said input side element and said output side element from the axial load to release the engagement of said input side element and said output side element;

wherein a fixed member is disposed on an outer periphery of an output shaft, and a driven rotary member is disposed on an outer periphery of said fixed member;

wherein a bearing is disposed between said fixed member and said driven rotary member; and wherein said bearing includes a seal bearing.

44. A starting clutch, comprising:

an input side element and an output side element which are engaged with each other by applying an axial load, thereby to transmit power;

a spring mechanism which permanently provides the axial load to said input side element and said output side element; and a release system including a fluid chamber to which fluid pressure is supplied to release said input side element and said output side element from the axial load to release the engagement of said input side element and said output side element, said fluid chamber being supplied with fluid pressure only during an operation to release the engagement of said input side element and said output side element.

45. A starting clutch according to claim 44, wherein said release system includes a hydraulic piston and cylinder, the cylinder constituting said fluid chamber.

46. A starting clutch according to claim 44, wherein said input side element is a separator plate of a multi-plate clutch, and said output side element is a friction plate of said multi-plate clutch.

47. A starting clutch according to claim 44, further comprising a damper.

48. A starting clutch according to claim 47, wherein said damper comprises a retainer plate secured to a housing, a pawl secured to a clutch case, and a spring disposed between said retainer plate and said pawl.

* * * * *